United States Patent Office 2,951,076
Patented Aug. 30, 1960

2,951,076

13-ALDEHYDO- AND 13 - CARBOXY - 18 - NOR-4-PREGNENE-3,20-DIONE AND DERIVATIVES THEREOF

Raphael Pappo, Skokie, Ill., assignor to G. D. Searle & Co., Chicago, Ill., a corporation of Delaware No Drawing. Filed Sept. 24, 1959, Ser. No. 841,946

8 Claims. (Cl. 260—239.57)

The present invention relates to 13-aldehydo- and 13-carboxy-18-nor-4-pregnene-3,20-dione and derivatives thereof and more particularly to compounds of the structural formula

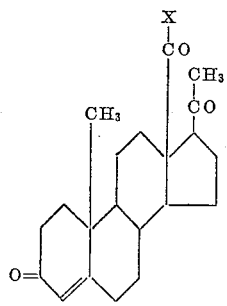

wherein X is a hydrogen, hydroxy, O-(alkali metal) or O-(lower alkyl) radical. Among the lower alkyl radicals suitable for the purposes of this invention are methyl, ethyl, straight chain and branched propyl, butyl, amyl, and hexyl. Suitable alkali metals are typically sodium, potassium, or lithium.

The compound in which X is a hydroxy group exists in equilibrium with its lactone, 18,20-epoxy-20-hydroxy-4-pregnene-3,18-dione of the structural formula

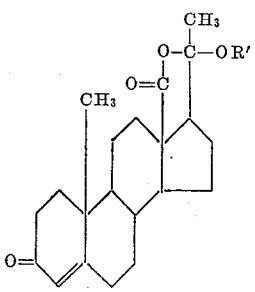

wherein R' is hydrogen. In acidic or neutral solution the compound exists as the lactone while on treatment with a dilute alkali metal carbonate it forms a corresponding alkali metal salt of 13β-carboxy-18-nor-4-pregnene-3-20-dione. On esterification with a diazoalkane there is obtained a mixture of the compounds in which R' is alkyl or X is O-alkyl. On esterification with an alkanol and a mineral acid only the lactonic compound, wherein R' is alkyl, is obtained.

The compounds of this invention are conveniently prepared using as a starting material 18,20-epoxy-20-hydroxy-4-pregnen-3-one as described in copending application Serial No. 775,099, filed November 20, 1958, issued as U.S. 2,907,758 on October 6, 1959, of which the present application is a continuation-in-part. Oxidation of 18,20-epoxy-20-hydroxy-4-pregnen-3-one with chromium trioxide in pyridine yields a mixture of 18,20-epoxy-20-hydroxy-4-pregnene-3,18-dione and 3,20-dioxo-4-pregnen-18-al. The former compound is readily separated by extraction with alkali. The aldehyde, the acid and its esters all have inhibitory action on the effect of desoxycorticosterone on salt excretion.

Intramolecular aldol condensation of 3,20-dioxo-4-pregnen-18-al yields 18,21-cyclo-4,18(21)-pregnadien-3,20-dione which is a compound with luteoid hormonal action.

The invention will appear in further detail from the consideration of the following examples which are given for the purpose of illustration only and are not to be construed as limiting the invention in spirit or in scope. Quantities are indicated as parts by weight.

*Example 1*

A solution of 0.47 part of 18,20-epoxy-20-hydroxy-4-pregnen-3-one in 3 parts of pyridine is added to a suspension of 0.5 part of chromium trioxide in 5 parts of pyridine. The mixture is stirred for 20 hours at room temperature, diluted with 27 parts of benzene and filtered. The brown chromium oxide is washed with more benzene and discarded. The combined filtrate and the washings are washed several times with cold aqueous sulfuric acid and then with water. The benzene solution is then extracted with cold 5% aqueous potassium carbonate. The residue is saved for isolation of the aldehyde as described below. The alkaline extract is acidified with excess aqueous sulfuric acid. The resulting precipitated acid is extracted repeatedly with a 3:1 mixture of benzene and ethyl acetate. The extracts are washed with water, dried and concentrated to dryness under nitrogen on the steam bath to yield a crude crystalline product. The latter is triturated with acetone and recrystallized from 2-propanol to yield 18,20-epoxy-20-hydroxy-4-pregnene-3,18-dione melting at about 225–227° C. The infrared spectrum, as determined in potassium bromide, shows strong maxima at 2.94, 5.70, 6.02, 8.52, and 10.95 microns; additional maxima are observed at 3.38, 3.42, 3.51, 6.22, 9.27, and 10.84 microns. An ultraviolet maximum is observed in a methanolic solution at 240.2 millimicrons with a molecular extinction coefficient of about 17,200. The compound is an aldosterone inhibitor. In acidic or neutral solutions this compound exists as a lactone. On treatment with dilute sodium carbonate it forms the sodium salt of 13β-carboxy-18-nor-4-pregnene-3,20-dione which is equivalent to the lactone for pharmacological purposes. The equilibrium can be depicted by the structural formulas

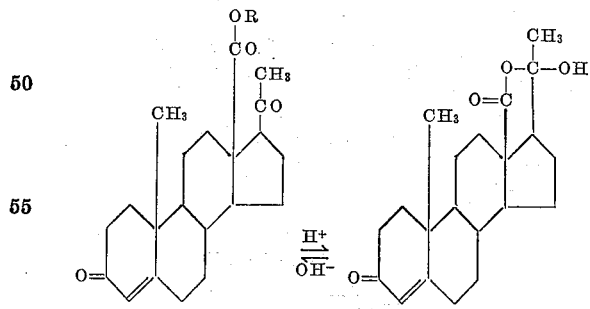

wherein H is hydrogen.

The neutral fraction, obtained in the foregoing procedure after extraction with potassium carbonate, is washed with water, dried, and evaporated to dryness under nitrogen in the steam bath. The residue is triturated with ether containing a trace of benzene to yield unconverted starting material. The mother liquors are evaporated to dryness and dissolved in a small amount of ether to yield 3,20-dioxo-4-pregnen-18-al, melting at about 140–142° C. The infrared spectrum shows maxima at 3.42, 3,49, 3.67, 5.83, 6.0, 6.22, 8.15, 10.55, 10.73, 11.22, and 11.57 microns. An ultraviolet maximum in methanolic solution is observed at 240.4 millimicrons with a molecular extinction coefficient of about 17,000. The compound has the structural formula

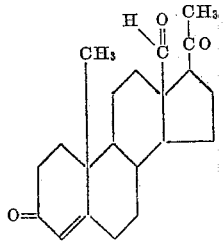

Example 2

A benzene solution of 3,20-dioxo-4-pregnen-18-al is passed through a column of almost neutral alumina and then eluted with a 2% solution of ether in benzene to yield 18,21-cyclo-4,18(21)-pregnadien-3,20-dione which, recrystallized from 2-propanol, melts at about 225–229° C. The infrared spectrum shows maxima at about 3.39, 3.42, 3.50, 5.84, 6.00, 6.20, 6.30, 6.92, 8.15, 8.39, 8.43, 11.60, and 11.95 microns. The methanolic solution shows an ultraviolet maximum at about 238.5 millimicrons with an extinction coefficient of about 25,000. The compound has a luteoid hormonal action. It has the structural formula

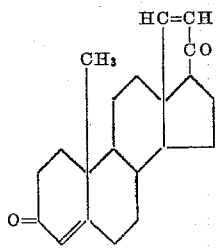

Example 3

A solution of 0.48 part of crude 18,20-epoxy-20-hydroxy-4-pregnene-3,18-dione in 100 parts of a 1% methanolic solution of hydrogen chloride is permitted to stand for 12 hours at room temperature and then concentrated at reduced pressure at 15° C. The residue is quickly diluted with benzene and washed successively with cold aqueous 20% potassium bicarbonate solution and water and then dried. The solution is then concentrated under nitrogen on a steam bath to yield a crystalline residue which, on recrystallization from a mixture of ether and benzene, affords 18,20-epoxy-20-methoxy-4-pregnene-3,18-dione melting at about 178–180° C. Infrared maxima are observed at 3.41, 3.50, 3.53, 5.67, 5.97, 6.20, 8.45, 9.51, 10.54, and 11.30 microns.

Substitution of ethanolic hydrochloric acid in the foregoing procedure yields 18,20-epoxy-20-ethoxy-4-pregnene-3,18-dione. The compound has infrared maxima at 3.41, 3.51, 5.66, 5.98, 6.20, 8.50, and 11.40 microns and the structural formula

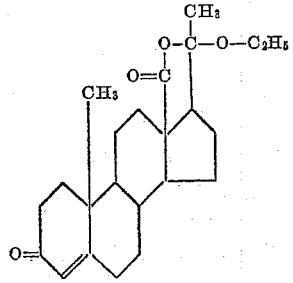

Example 4

A solution of 1 part of 18,20-epoxy-20-hydroxy-4-pregnene-3,18-dione in 250 parts of methanol is cooled and treated in small portions with ethereal diazomethane until the solution retains a persistent yellow color. After a few minutes of standing at room temperature the solution is concentrated under nitrogen and the residue is crystallized from methanol to yield the methyl ester of 13β-carboxy-18-nor-4-pregnene-3,20-dione in elongated prisms melting at about 184–186° C. The infrared absorption spectrum shows maxima at 3.41, 3.51, 5.79, 5.87, 5.95, 6.20, 8.13, 8.28, 8.62, and 11.37 microns.

Substitution of diazoethane in the foregoing procedure yields the ethyl ester of 13β-carboxy-18-nor-4-pregnene-3,20-dione of the structural formula

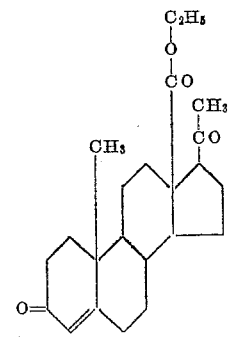

Infrared maxima are observed at 3.41, 3.51, 5.80, 5.88, 5.97, 6.20, 8.30, and 11.40 microns.

What is claimed is:

1. A compound of the structural formula

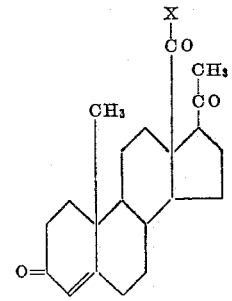

wherein X is a member of the class consisting of hydrogen, hydroxy, O-(alkali metal), and O-(lower alkyl) radicals.

2. Methyl ester of 13β-carboxy-18-nor-4-pregnene-3,20-dione.
3. Sodium salt of 13β-carboxy-18-nor-4-pregnene-3,20-dione.
4. 3,20-dioxo-4-pregnen-18-al.
5. A compound of the structural formula

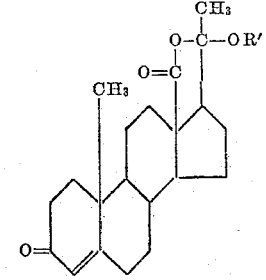

wherein R' is a member of the class consisting of hydrogen and lower alkyl radicals.

6. 18,20-epoxy-20-hydroxy-4-pregnene-3,18-dione.
7. 18,20-epoxy-20-methoxy-4-pregnene-3,18-dione.
8. 18,21-cyclo-4,18(21)-pregnadien-3,20-dione.

References Cited in the file of this patent

Neher et al.: Helv. Chim. Acta, vol. 39, pages 2062–88 (1956).

Cainelli et al.: Helv. Chim. Acta, vol. 42, pages 1124–27 (1959).